March 7, 1967  A. KOSTOPOULOS ETAL  3,307,847
CANDLEPIN ELEVATOR, DISTRIBUTOR AND CONTROL SYSTEM
Filed April 15, 1964  5 Sheets-Sheet 1
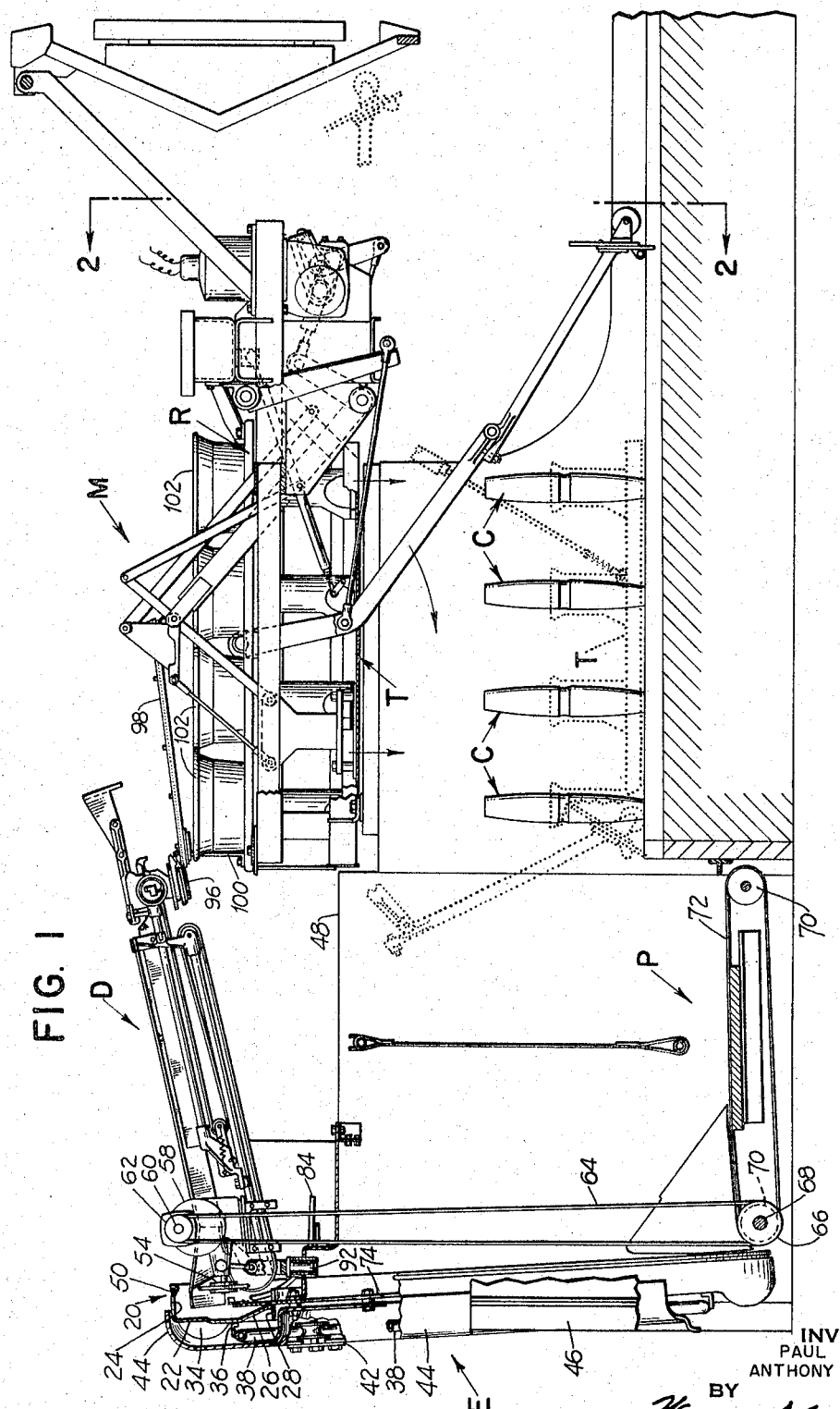
INVENTORS
PAUL V. COLOMBO
ANTHONY KOSTOPOULOS
BY
Wentworth S. Clapham
ATTORNEY March 7, 1967 A. KOSTOPOULOS ET AL 3,307,847
CANDLEPIN ELEVATOR, DISTRIBUTOR AND CONTROL SYSTEM
Filed April 15, 1964 5 Sheets-Sheet 2
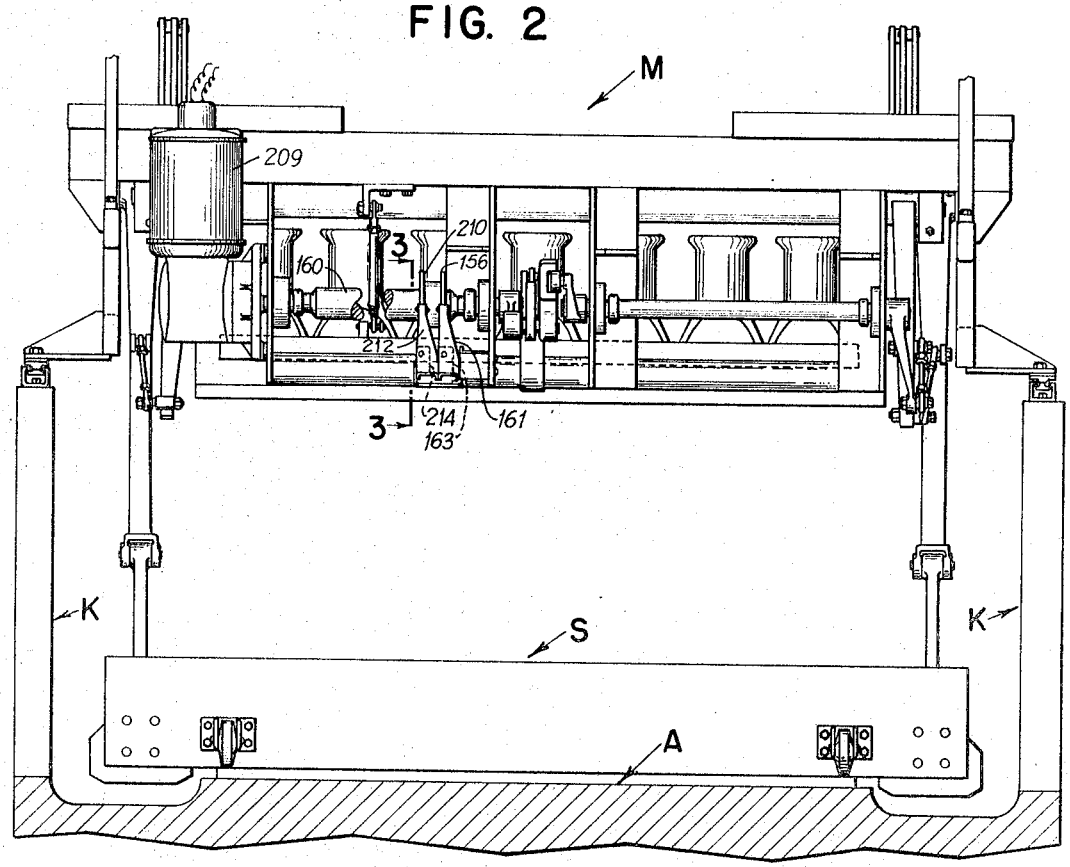
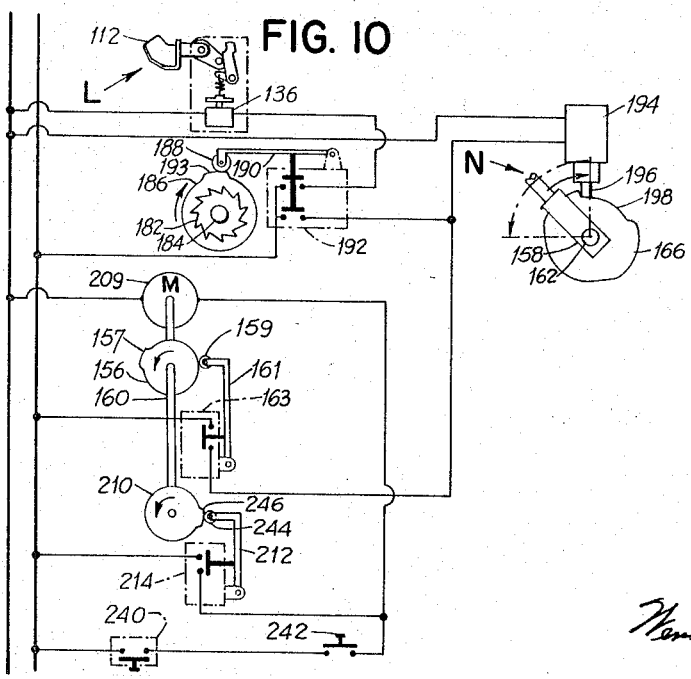
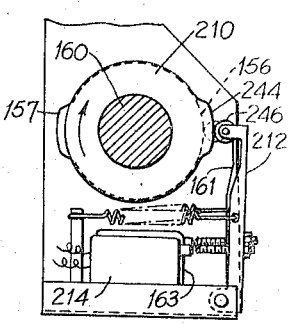
INVENTORS
PAUL V. COLOMBO
ANTHONY KOSTOPOULOS
BY
*Wentworth E. Clapham*
ATTORNEY

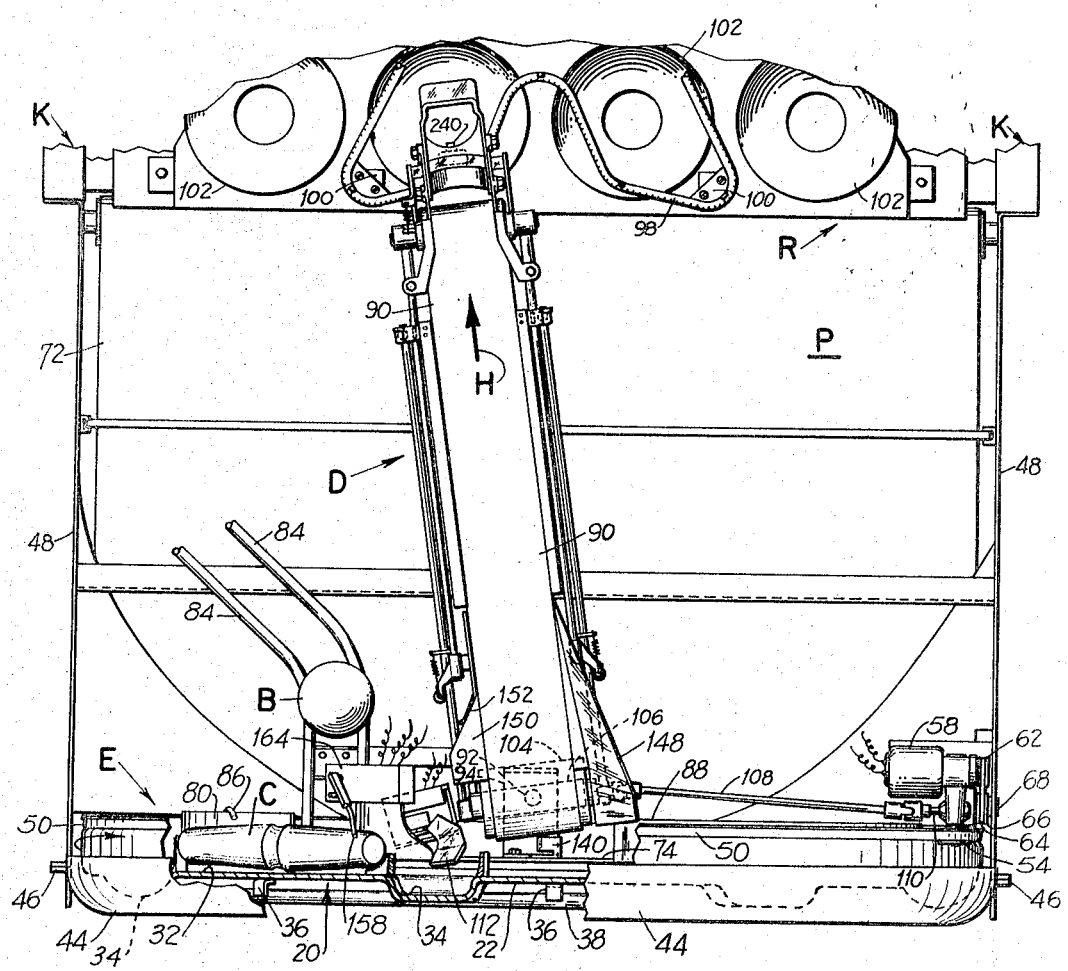

March 7, 1967  A. KOSTOPOULOS ETAL  3,307,847

CANDLEPIN ELEVATOR, DISTRIBUTOR AND CONTROL SYSTEM

Filed April 15, 1964  5 Sheets-Sheet 4

INVENTORS
PAUL V. COLOMBO
ANTHONY KOSTOPOULOS
BY
ATTORNEY

March 7, 1967  A. KOSTOPOULOS ET AL  3,307,847
CANDLEPIN ELEVATOR, DISTRIBUTOR AND CONTROL SYSTEM
Filed April 15, 1964  5 Sheets-Sheet 5

INVENTORS
PAUL V. COLOMBO
ANTHONY KOSTOPOULOS
BY
ATTORNEY

United States Patent Office 3,307,847
Patented Mar. 7, 1967

3,307,847
CANDLEPIN ELEVATOR, DISTRIBUTOR AND
CONTROL SYSTEM
Anthony Kostopoulos, Stamford, Conn., and Paul V.
Colombo, Mount Vernon, N.Y., assignors to American Machine & Foundry Company, a corporation of
New Jersey
Filed Apr. 15, 1964, Ser. No. 366,214
2 Claims. (Cl. 273—43)

This invention relates to bowling pin spotting machines, and particularly to improved pin elevating and distributing means for supplying bowling pins to the spotting table of pin spotting machines. Though not limited thereto, the invention is particularly advantageous in connection with candlepin spotting machines.

One object of the invention is to provide an improved bowling pin elevating and distributing apparatus for pin-spotting machines.

Another object is to devise a particularly effective system for transferring bowling pins from an elevating mechanism to the input end of a bowling pin distributor.

A further object is to provide dependable means for removing a predetermined number of bowling pins from a continuously operating bowling pin elevator and directing the pins so removed onto a pin distributor.

In order that the manner in which these and other objects are achieved in accordance with the invention can be understood in detail, one particularly advantageous embodiment of the invention will be described with reference to the accompanying drawings, which form a part of this specification, and wherein:

FIGURE 1 is a side elevational view, with some parts shown in vertical section and others broken away for clarity of illustration, of a bowling pin spotting machine constructed in accordance with one embodiment of the invention;

FIGURE 2 is a front elevational view of the machine of FIGURE 1, taken generally on line 2—2, FIGURE 1;

FIGURE 3 is a fragmentary view taken on line 3—3, FIGURE 2, and illustrating a control cam mechanism employed in the machine of FIGURE 1;

FIGURE 4 is a top plan elevational view, with parts broken away for clarity, illustrating the pin and ball elevating mechanism and the pin distributor of the machine of FIGURE 1;

FIGURE 10 is a schematic wiring diagram of the control circuit employed in the invention.

Figure 5:
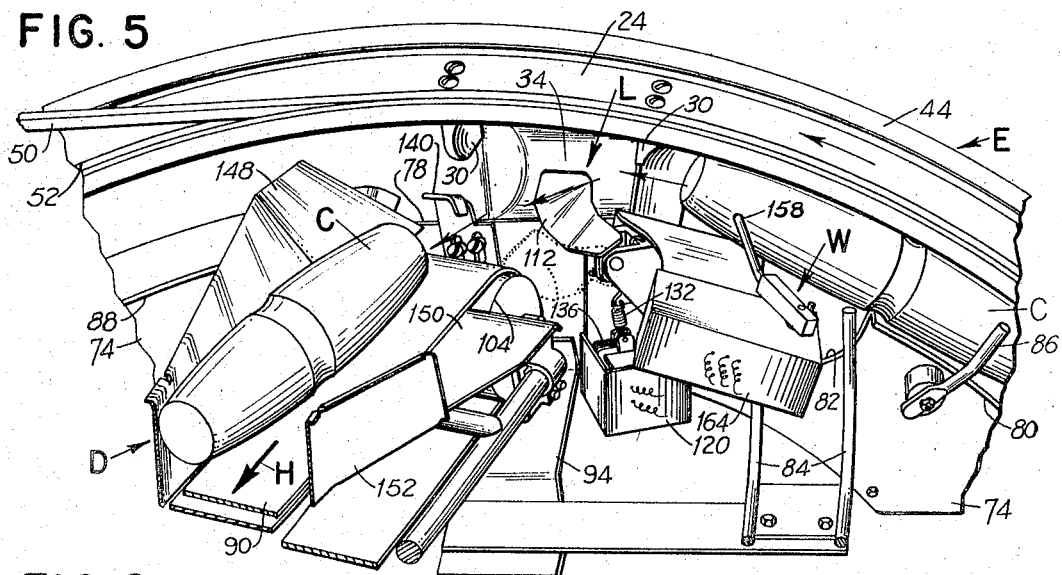
FIGURE 5 is a perspective view illustrating the top portion of the elevator mechanism in combination with means for deflecting the pins from the elevating mechanism onto the distributor in accordance with the invention.

Referring now to the drawings in detail, the embodiment of the invention chosen for illustration comprises a stationary pin guiding table R, a pin spotting table T arranged beneath table R for movement vertically between a raised position, seen in full lines in FIGURE 1, and a lowered, pin spotting position, shown in dotted lines in FIGURE 1, a combined ball and pin elevator indicated generally at E, and a pin distributor D arranged to deliver bowling pins via the guide funnels 102 of table R to the pin spotting cups of the spotting table T. The guide table R, the spotting table T, and the drive mechanism for the spotting table all are constructed in accordance with copending application Serial Number 359,607, filed April 14, 1964, by Fred J. Jark, James D. Elliott and Thomas W. Edwards.

Figure 6:
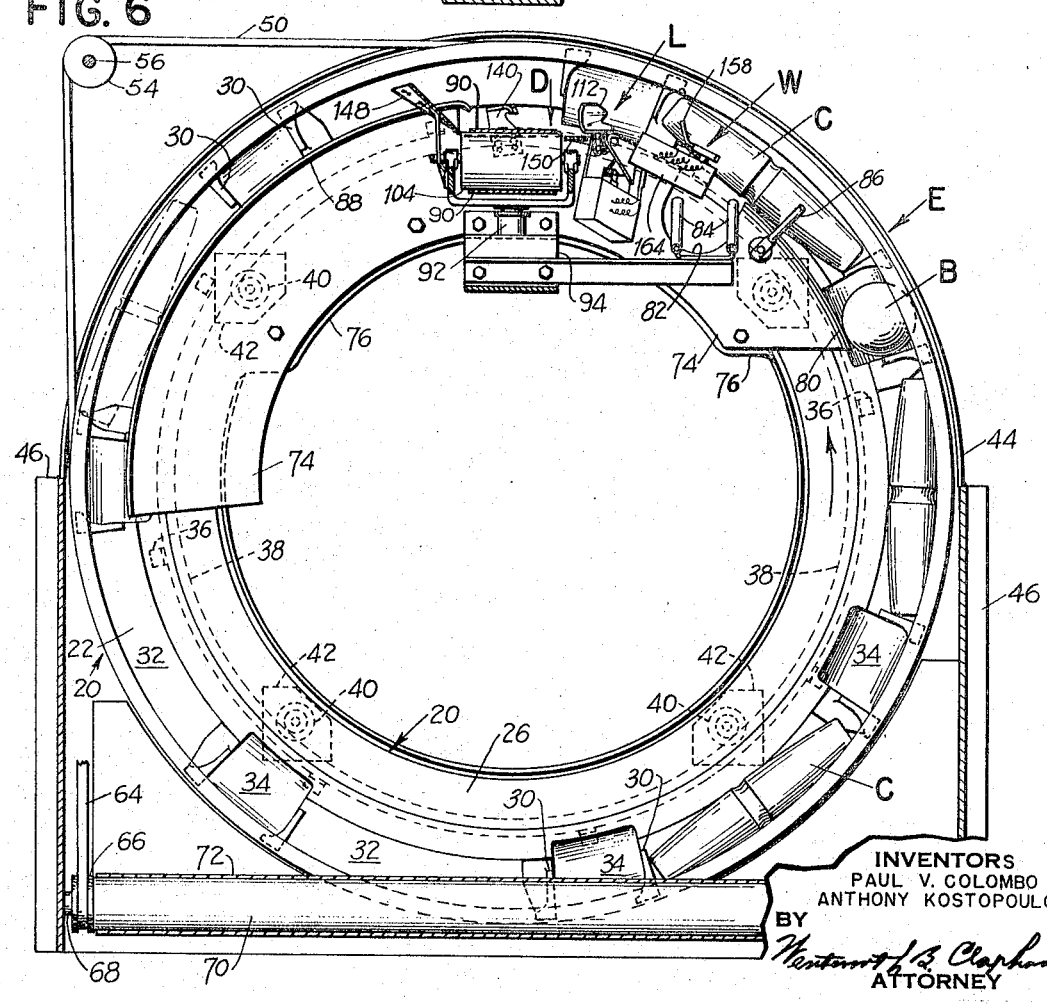
FIGURE 6 is a front elevational view of the pin and ball elevating mechanism, taken on line 6—6, FIGURE 1.
Figure 7:
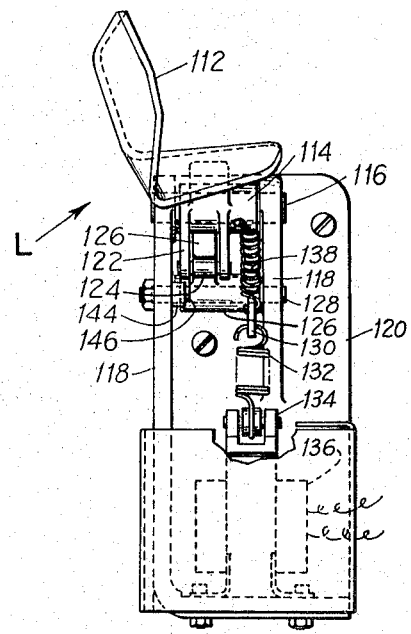
FIGURES 7 and 8 are side elevational views, with parts broken away for clarity, of the automatic pin deflecting device employed in the machine of FIGURE 1.

Elevator E comprises an elevating wheel 20 which lies in a plane generally transverse to the alley at the rear of the pit P, the plane of the elevating wheel slanting slightly upwardly and rearwardly. Wheel 20 is generally in the form of an annular, trough-like ring opening forwardly of the alley and comprising an annular flat body portion 22, an outer peripheral portion 24 projecting forwardly from body portion 22, and an inner circular rim 26 which slants forwardly and upwardly and terminates in a rearwardly projecting circular edge flange 28, as seen in FIGURE 1. As illustrated in FIGURE 6, wheel 20 is provided with a plurality of spaced cleats or lugs 30 attached to the inner face of portion 24 and so arranged as to form a plurality of large pin-receiving pockets 32 and smaller ball-receiving pockets 34, each pocket 34 being disposed between two of the pockets 32. Pockets 32 are slightly longer than a candlepin C. Pockets 34 are slightly larger than the diameter of a regulation ball B employed in the game of candlepins. The rear wall of each pocket 32 is defined by flat body portion 22 of the wheel, while the rear wall of each pocket 34 is formed of a semicircular, rearwardly curving piece to accommodate the ball to be retained in the pocket.

A plurality of lugs 36 are secured to the rear face of body 22 of the wheel and an annular supporting ring 38, fashioned from tube or rod stock, is welded to the lugs 36. Ring 38 engages a plurality of spaced, grooved rollers 40 all of which are rotatably mounted on suitable brackets 42 secured to the rear wall of frame housing 44. Frame housing 44 is welded to a pair of uprights 46, FIGURE 6, suitably attached to the kickback plates 48 of pit P, as seen in FIGURE 4. The wheel 20 may thus rotate freely about the grooved rollers 40 while being maintained stably in its substantially upright, slightly rearwardly slanting position. The rearwardly slanting position of the wheel is provided to assure a better seat of the pins and balls in their respective pockets during elevation and to eliminate the need for relatively cumbersome pin and ball retainers.

Wheel 20 is continuously rotated by means of a V-belt 50 engaged in a suitable annular groove 52, FIGURE 5, formed in the front edge of the outer peripheral portion 24 of the elevating wheel. Belt 50 extends about a driving pulley 54, FIGURE 6, secured to drive shaft 56 projecting from the gear reduction box driven by motor 58, FIGURE 4.

The gear reduction box driven by motor 58 includes a second output shaft 60 carrying a pulley 62, FIGURE 1, which drives a pulley 66, through belt 64. Pulley 66 is mounted on the pit conveyor drive shaft 68 which, through suitable horizontal transverse rollers 70, drives the pit conveyor belt 72.

In order to retain candlepins C within pockets 32 of the wheel 20 while those pockets pass through the upper portion of the circular path defined by the elevating wheel, an arcuate stationary plate 74 is provided, being mounted on a flange 76 presented by frame housing 44, as seen in FIGURES 1 and 6. Plate 74 is so arranged that its outer edge portion projects beyond the inner rim 26 of the wheel so as to retain the candlepins C in the manner seen in FIGURE 6. At the upper central portion of the path of the elevating wheel, plate 74 is provided with a cutout 78, FIGURES 5 and 6, which is in line with and at approximately the same level as pin distributor D.

The portion of plate 74 to the right of cutout 78, as viewed in FIGURE 6, is provided with a forwardly projecting flange 80 serving as a support for the pins C and balls B. This portion of plate 74 is also provided with a semicircular opening 82, FIGURES 5 and 6, which permits the balls B to drop from th elevating wheel onto a suitable stationary ball return runway 84. To further assist in preventing the pins C from falling from the wheel pockets 32 as these pockets approach the top of their travel, an upwardly projecting guide rod 86, resiliently mounted on plate 74, is provided.

The portion of plate 74 to the left of cutout 78, as viewed in FIGURE 6, is slightly higher than on the right side of the cutout and is provided with a forwardly projecting flange 88. This portion of plate 74, with flange 88, assures that pins which have not been deflected from the elevating wheel will remain firmly seated in their respective pockets during their downward travel and thus remain in the pockets until subsequently removed as hereinafter described.

Pin distributor D may be of the general type disclosed in U.S. Patent 2,767,984, issued October 23, 1956, to John Zuercher. The rear or pin-receiving end of distributor D, disposed adjacent cutout 78 in plate 74, is supported by a swivel member 92, FIGURES 1, 4 and 6, which in turn is held by a suitably formed supporting bracket 94 secured to plate 74. At its front end, distributor B carries an indexing device 96, FIGURE 1, engaged with a heart-shaped track 98 supported by brackets 100 mounted on the stationary pin guiding table R. Indexing mechanism 96 includes a pair of opposed indexing gears, one engaging the outer surface of track 98 and the other engaging the inner surface thereof, so that the front end of the distributor is stably supported on track 98 during movement of the distributor to register successively with the guide funnels 102. Both distributor B and track 98 slant downwardly and rearwardly at substantially the same angle so that the distributor need have only the single axis of pivotal movement defined by member 92.

The endless conveyor belt 90 of distributor D is arranged, generally as disclosed in the aforementioned Patent 2,767,984, so that the effective length of the distributor can be varied in accordance with the locations of the several guide funnels 102. Belt 90 is driven continuously in the direction of arrow H by means of a pulley 104 mounted on shaft 106, FIGURE 4, which is connected to one end of a drive shaft 108 through a suitable universal coupling. The other end of shaft 108 is connected to a shaft 110, again by means of a universal coupling, shaft 110 being an output shaft of the gear reduction box driven by motor 58.

Delivery of candlepin C from the pockets 32 of the elevating wheel onto the conveyor belt 90 at the pin-receiving end of the distributor D is accomplished by the deflecting device L seen in FIGURES 4–8. Device L includes a deflector plate 112 having a hub 114 rotatably mounted on stud shaft 116, the latter being supported by a pair of spaced flanges 118 projecting from supporting bracket 120 fixed to plate 74. Abifurcated arm 122 projects from hub 114 and, at its free end, carries a roller 124 which loosely engages a control arm 126. Arm 126 is pivoted on a stud shaft 128 supported by flanges 118. Formed integrally with control arm 126, and projecting at an angle thereto, is an actuating lever 130, the free end of lever 130 being connected to one end of a tension spring 132. The remaining end of spring 132 is connected to the armature 134 of an actuating solenoid 136 mounted on bracket 120. Lever 130, and therefore armature 134, are biased upwardly by a tension spring 138 connected between lever 130 and the upper portion of bracket 120. With solenoid 136 de-energized, lever 130 and control arm 126 are in raised positions, as indicated in dotted lines in FIGURE 8. With arm 126 in raised position, the deflector 112 gravitates downwardly to the position shown in dotted lines in FIGURE 8.

Figure 8:
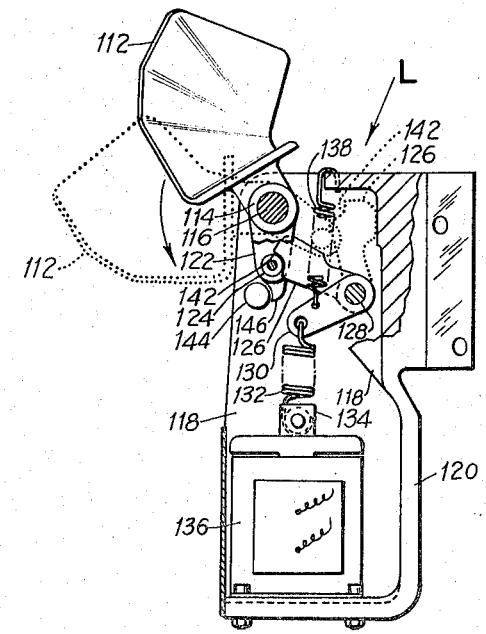

Bracket 120 is so disposed on plate 74 that, when deflector 112 occupies the lowered position seen in dotted lines in FIGURE 8, the deflector is disposed below the path of the pins C in the pockets 32 of elevating wheel 20. Accordingly, so long as the solenoid 136 is de-energized, pins C can pass freely by device L without being removed from the elevating wheel. While being carried past cutouts 78 in plate 74, the pins are retained by a suitably shaped stationary guide plate 140 mounted on the front face of plate 74, as seen in FIGURES 4–6. When solenoid 136 is energized, so that armature 134 is actuated downwardly, lever 130 is pivoted downwardly to the position seen in full line in FIGURE 8, causing control arm 126 to swing deflector 112 upwardly to the full line position seen in FIGURE 8. The lower edge of control arm 126 is provided with a notch 142 into which roller 124 falls as arm 126 is pivoted downwardly. Engagement of roller 124 in notch 142 serves to lock the deflector in its raised position. Further clockwise movement of the deflector is opposed by a stop in 144 carried by one of the flanges 118 and arranged to be engaged by a projection 146 on arm 122.

Thus in its raised position, deflector 112 projects into the path of travel of the pins retained in pockets 32 of wheel 20. As each pin C engages deflector 112, the latter cams the pin forwardly out of its pocket and guides the pin diagonally onto the moving conveyor belt 90 at the pin-receiving end of the distributor D, the guiding action being assisted by a slanted guide plate 148, FIGURES 5 and 6, mounted at the edge of the conveyor opposite the deflector. An additional pin-supporting plate 150 extends horizontally at the edge of the conveyor adjacent the deflector and includes an upright portion 152 which slants forwardly toward the conveyor. It will accordingly be understood that, with deflector 112 in its raised position, each of the pins C delivered to the location of device L will be deflected forwardly onto conveyor belt 90, proper final positioning of the pin on the conveyor belt being assured by elements 148, 150 and 152.

Device L operates in conjunction with a pin-counting device indicated generally at W and a timing switch 154 actuated by a timing cam 156 mounted on the main drive shaft 160 of the machine. The electrical circuits interconnecting the elements just mentioned are illustrated in FIGURE 10 and will be described hereinafter.

Figure 9:
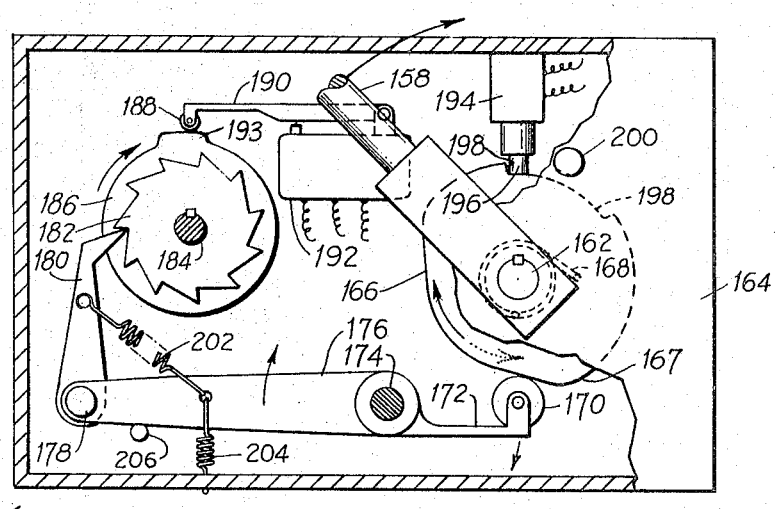
FIGURE 9 is a top plan elevational view, with casing portions broken away for clarity, of pin counting means employed in the invention.

Counting device W, shown in detail in FIGURE 9, comprising a pin sensing arm 158 secured to the upper end of a shaft 162 rotatably supported by bearings carried by housing 164. A counter-actuating cam 166 is also fixed to shaft 162. Shaft 162, and therefore pin sensing arm 158, are biased in a clockwise direction, as viewed in FIGURE 9, by a torsion spring 168 which surrounds shaft 162 and has one end anchored to housing 164 and the other end attached to cam 166. With the device W mounted as seen in FIGURE 4, such clockwise biasing of shaft 162 serves to bias the pin sensing arm 158 normally into the path of travel of pins carried in the pocket 32 of elevating wheel 20. Upon arrival of a pin C at the location of device W, movement of the pin forces arm 158 to swing in a counterclockwise direction, as viewed in FIGURE 9, against the biasing action of spring 168. Once the pin has passed device W, arm 158 is then urged to its pin sensing position again by spring 168.

Cam 166 is so designed that, during each cycle of swinging movement of arm 158 which results from passage of a pin, the cam will engage and depress a roller 170 carried at one end of an arm 172 pivotally supported by stud 174. Integral with arm 172 is a lever 176, the end of lever 176 being pivotally attached, by pin 178, to a pawl 180. Pawl 180 operatively engages a ratchet wheel 182 keyed to a shaft 184 supported in suitable bearings carried by housing 164. Also secured to shaft 184 is a cycle cam 186 engaged by a roller 188 rotatably mounted on the free end of a switch-actuating arm 190. Arm 190 is resiliently biased downwardly and serves to actuate the snap switch 192 carried by housing 164.

Ratchet wheel 182 is provided with eleven equally spaced teeth so that eleven pin sensing movements of arm 158 will, through cam 166, arms 172 and 176, and pawl 180, advance the ratchet wheel through one complete revolution. Cycle cam 186 includes a single high spot 194 so situated in relation to the position of ratchet wheel 182 as to engage roller 188, and raise switch actuating arm 190, at the end of each complete cycle of rotation of the ratchet wheel.

Pin counting device W is provided with latch means automatically operated to deactivate the pin counting device once pins C have been deflected from the elevating wheel and deposited on the distributor D. This means includes a solenoid 194 arranged to actuate a resiliently mounted latch plunger 196, the free end of the latch plunger facing the periphery of cam 166. Cam 166 is provided with a latch notch 198, FIGURE 9.

In the operation of device W, the actual counting action takes place after a pin has passed the counting arm 158 and the latter, being urged by spring 168, disengages from the end of the pin and snaps back into the space behind the passed pin. Since the counter actuating cam 166 is also secured to shaft 162, the clockwise rotation of arm 158 caused by this action also imparts clockwise rotation to the cam 166 which in turn effects an engagement of its lower high lobe 167 with roller 170, causing a depression of the free end of arm 172 and a raising of its extension 176 resulting, through pawl 180, in a clockwise rotation of the ratchet wheel 182 for the distance of one tooth.

Although the ratchet wheel 182 is provided with eleven teeth, only ten pins are deflected by device L from the pin elevating wheel 20 onto the distributor D for delivery to the pin receiving table R. The pin deflecting device L (FIGURES 7 and 8) is timed and controlled by the cycle cam 186, through switch 192. The lobe 193 of cam 186 is of such a length and so arranged that, when pins are called for and the counter arm 158 moves in the path of the pins in the elevating wheel 20, the first clockwise movement of the counter arm 158, although effecting the rotation of the ratchet wheel 182 for the distance of one tooth, does not close switch 192. The deflector plate or plow 112 of the pin deflecting device L is therefore not moved into pin ejecting position. This first non-transmitted action of the counter arm 158 is provided for the purpose of timing and synchronizing the action of deflecting device L in relation to the pins in the continuously rotating elevating wheel 20 and thus prevents jamming when the plow 112 snaps into the path of the pins in wheel 20.

The next ten clockwise movements of counter arm 158, after the first non-transmitted one, represent the count of ten pins as each of the latter passes said arm. Each clockwise movement of arm 158 effects one increment of clockwise advancement of the ratchet 182 and the cycle cam 186, through a distance represented by one tooth, so that at the end of the tenth advancement of cycle cam 186 the roller 188 rides up on the high portion or lobe 193 of cam 186 and thus causes switch 192 to open. Opening of switch 192 in turn effects the deenergization of solenoid 136 of the pin deflected device L, thus causing plow 112 to be withdrawn from the path of the pins in the elevating wheel 20 so that no further pin is deflected from the same. After the clockwise movement of the arm 158 which counted the tenth pin and thus incapacitated the deflecting mechanism and also deenergized the latch solenoid 194, the next following pin moves the counter arm 158, together with cam 166 in a counterclockwise direction as the pin passes. Since latch solenoid 194 is now deenergized, the spring mounted plunger 196 of the same now engages the periphery of cam 166 and drops into the notch 198, so that the arm 158, after losing contact with the pin, is arrested, as shown in FIGURE 9, and prevented from further clockwise movements or counting action until the latch solenoid 194 is energized again and lock plunger 196 is withdrawn from the lock notch 198 in cam 166.

Referring to FIGURE 10, it will be seen that the control circuit includes a manually operated, normally open switch 242 and a normally open table switch 240, the latter being disposed in that one of guide funnels 102 which receives the last of the ten pins delivered to table R during each cycle of operation. Switches 240 and 242 are connected in series in the energizing circuit for driving motor 209. When the operation is to be commenced, the operator or player closes switch 242. With switch 240 closed because of presence of the tenth pin of the last set of pins delivered, drive motor 209 is energized to rotate shaft 160. Rotation of shaft 160 causes lobe 246 of cam 210 to disengage from follower 244, switch actuating arm 212 then returning to its normal position and closing the contacts of switch 214. Switch 214 being connected in parallel with the series combination of switches 240 and 242, energization of motor 209 is continued even though the start switch returns to its normal open position. One cycle of operation of the machine is now commenced, sweep S being lowered and the pins carried by table T being deposited in their proper positions on the alley.

When drive shaft 160 has turned through approximately 180°, lobe 157 of timing cam 156 engages follower 159, pivoting actuating arm 161 to close the contacts of switch 163. Closing of switch 163 energizes latch solenoid 194, so that plunger 196 is withdrawn from engagement with the notch 198 of cam 166 and arm 158 is permitted to move from its inactive position (N, FIGURE 10) to an active position determined by engagement of the arm with stop pin 200, FIGURE 9, such movement of arm 158 being caused by torsion spring 168. In the position determined by stop pin 200, counting arm 158 projects into the path of the pins C carried by elevating wheel 20.

As previously described, this first movement of arm 158 into engagement with stop pin 200 advances ratchet wheel 182 through a distance corresponding to one tooth, but follower 188 of switch arm 190 still remains in engagement with the lobe 193 of cam 186 so that switch 192 remains open. Switch 192 is not actuated to closed condition until the second movement of arm 158 occurs as a result of passing of a pin C in wheel 20.

Switch 192 is of conventional snap switch construction and includes two sets of contacts, one connected to control solenoid 194 and the other connected to control solenoid 136. So long as follower 188 engages the main, lower surface of the periphery of cam 186, both sets of contacts of switch 192 remain closed and both solenoids 194 and 136 are energized. Accordingly, under these conditions, deflecting plate 112 is disposed in the path of travel of the pins in elevating wheel 120 and is effective to deflect the pins from the wheel onto the pin distributor D for delivery to the guide funnels 102 of table R. Energization of solenoid 194 assures that cam 166 will be free to oscillate so long as pins are being deflected by the device L. When device L has acted to deflect ten pins from wheel 20, these pins being counted via the action of arm 158, lobe 193 again engages follower 188 so that both sets of contacts of switch 192 are opened simultaneously. Such actuation of switch 192 simultaneously incapacitates both the deflecting device L and counting device W.

A tension spring 202, connecting the extension 176 of arm 172 with pawl 180, is provided for the purpose of keeping the pawl in constant engagement with the ratchet wheel. Another tension spring 204, anchored to housing 164 and attached to the extension 176 of arm 172, is employed to assure the return stroke of extension 176.

Though one particularly advantageous embodiment of the invention has been chosen for illustrative purposes, it will be understood by those skilled in the art that various changes and modifications can be made therein without departing from the scope of the invention as defined by the appended claims.

What is claimed is:

1. In a bowling pin spotting machine, the combination of
   a stationary pin receiving and guiding table mounted above the alley bed, said table comprising
      a plurality of upwardly flaring pin guiding funnels spaced apart horizontally in triangular fashion such that each of said funnels is aligned at least generally above the playing position for a different one of the bowling pins to be spotted;
   a vertically reciprocatable pin spotting table disposed beneath said pin receiving and guiding table and equipped with a plurality of pin cups each aligned beneath a different one of said funnels;
   a continuously driven bowling pin elevator spaced rearwardly from said tables, said elevator comprising
      endless conveyor means arranged to receive pins from the pit of the bowling alley and carry the pins successively to an elevated pin discharge position;
   a pin distributor comprising
      a continuously driven extensible endless conveyor having a pin receiving portion disposed adjacent said elevated pin discharge position,
      means mounting said conveyor for pivotal movement in a generally horizontal path of travel about a generally upright axis located at said pin receiving portion,
      a stationary guide track mounted above said pin receiving and guiding table and lying in a plane transverse to said generally upright axis, said extensible conveyor having a delivery end adjacent said guide track, and
      indexing means connecting the delivery end of said extensible conveyor to said guide track, said guide track and indexing means being operative to successively position the delivery end of said extensible conveyor in operative locations for delivery of pins to said funnels;
   pin deflecting means mounted adjacent said elevated pin discharge position and actuatable to a pin deflecting position in which said deflecting means deflects each pin onto said pin receiving portion of said extensible conveyor as the pins are presented at said elevated pin discharge position by said elevator;
   pin counting means operatively arranged to count the pins as they are delivered by said elevator; and
   control means responsive to said pin counting means for operating said pin deflecting means to deflect onto said pin receiving portion of said extensible conveyor only a predetermined number of pins equal to the number of said funnels.

2. In a bowling pin spotting machine, the combination of
   a pin spotting table mounted for movement between a raised position and a lowered position adjacent the alley bed;
   a pin elevator operative to receive pins from the pit and elevate the pins preparatory to delivery of the pins to the spotting table, said elevator comprising
      an endless conveyor device arranged to carry the pins in succession to an elevated point of discharge, said conveyor device retaining the pins until the pins are removed therefrom, and
      means for continuously driving said conveyor device;
   a pin distributor device having a pin-receiving end and a pin-discharge end,
      said distributor device being mounted with its pin-receiving end adjacent said elevated point of discharge and its pin-discharge end movably disposed above said spotting table for delivery of pins thereto;
   a pin deflector mounted adjacent said elevated point of discharge and movable between an active position, in which said deflector is disposed in the path of travel of pins as the pins are carried by said endless conveyor device, and an inactive position, in which said deflector is displaced from said path of travel,
      said deflector being operative, when in said active position, to deflect pins sequentially onto said pin-receiving end of said distributor device as the pins are carried to said elevated point of discharge by said endless conveyor device;
   actuating means connected to said deflector for actuating the same between said active and inactive positions;
   pin counting means disposed adjacent said endless conveyor device and operative to count the pins as they are advanced toward said elevated point of discharge;
   control means responsive to said pin counting means and operative to control said actuating means to effect return of said deflector to said inactive position when said pin counting means has detected a predetermined number of pins,
   said pin counting means comprising
      a movable pin sensing element,
      means biasing said pin sensing element into the path of travel of pins advanced by said endless conveyor device, and
      latch means for latching said pin sensing element in an inactive position displaced from said path of travel;
   the machine further comprising
   means responsive to the operative state of the machine for operating said latch means to release said sensing element when said spotting table is in said raised position, ready to receive pins.

References Cited by the Examiner

UNITED STATES PATENTS

| | | | |
|---|---|---|---|
| 2,767,983 | 10/1956 | Holloway et al. | 273—43 |
| 2,821,395 | 1/1958 | Dumas | 273—43 |
| 2,911,218 | 11/1959 | Scherzinger | 273—43 |
| 2,972,479 | 2/1961 | Congelli et al. | 273—43 |
| 3,004,761 | 10/1961 | Congelli et al. | 273—43 |
| 3,079,154 | 2/1963 | Zuercher | 273—43 |
| 2,132,863 | 5/1964 | Congelli | 273—43 |
| 3,142,486 | 7/1964 | Viescas | 273—43 |
| 3,219,346 | 11/1965 | Gautraud et al. | 273—43 |

RICHARD C. PINKHAM, *Primary Examiner.*

ANTON O. OECHSLE, *Examiner.*